United States Patent [19]

Theodore

[11] 4,451,605

[45] May 29, 1984

[54] SOLVENT-BASED, ONE-PART, FILLED POLYURETHANE FOR FLEXIBLE PARTS

[75] Inventor: John J. Theodore, Hudson, Wis.

[73] Assignee: Minnesota Mining and Manufacturing Company, Saint Paul, Minn.

[21] Appl. No.: 375,954

[22] Filed: May 7, 1982

[51] Int. Cl.$^3$ .......................... C08K 3/34; C08K 3/26; C08K 3/08; C08K 3/22

[52] U.S. Cl. .................................. 524/423; 523/219; 524/425; 524/439; 524/441; 524/590; 524/445; 524/448; 524/449; 524/451; 524/361; 524/379; 524/919

[58] Field of Search .............. 524/590, 423, 591, 425, 524/451, 439, 377, 441, 376, 445, 389, 448, 379 R, 449

[56] References Cited

U.S. PATENT DOCUMENTS

| | | | |
|---|---|---|---|
| 3,737,405 | 6/1973 | Linder et al. | 260/40 |
| 3,873,475 | 3/1975 | Pechacek et al. | 260/2.5 |
| 4,009,145 | 2/1977 | Hunt | 260/40 |
| 4,053,448 | 10/1977 | Holle | 260/40 |
| 4,150,211 | 4/1979 | Müller | 524/590 |
| 4,187,348 | 2/1980 | Dearlove et al. | 428/418 |
| 4,273,700 | 6/1981 | Kho | 524/590 |
| 4,281,078 | 7/1981 | Strolle | 524/590 |
| 4,289,813 | 9/1981 | Blomeyer | 524/590 |

FOREIGN PATENT DOCUMENTS

| | | | |
|---|---|---|---|
| 55-1963 | 1/1980 | Japan | 524/590 |
| 56-163147 | 12/1981 | Japan | 524/590 |

*Primary Examiner*—C. A. Henderson
*Attorney, Agent, or Firm*—Donald M. Sell; James A. Smith; Richard Francis

[57] ABSTRACT

A one part composition useful as a putty for filling recessed areas in flexible parts of damaged auto bodies and the like is provided. The curable composition has a viscosity in the range of 50,000 to 450,000 cps and comprises by volume 6 to 25 parts binder comprising substantially non-reactive solvent-soluble polyurethane, 43 to 68 parts solvent for the binder and 20 to 42 parts talc filler. Other fillers may also be included. The preferred polyurethane binder is a linear polyurethane elastomer which is substantially free of cross-links and has an elongation at break value in the range of 300–850% and a tensile strength in the range of 1,500 to 7,000 psi.

5 Claims, No Drawings

SOLVENT-BASED, ONE-PART, FILLED POLYURETHANE FOR FLEXIBLE PARTS

DESCRIPTION

1. Technical Field

The invention relates to a solvent-based, one-part, filled polyurethane composition which is useful as a putty for filling recessed areas in flexible automobile parts.

2. Background Art

Flexible automobile components such as reaction injected molded (RIM) urethane bumpers and filler panels, termed "soft facia", upon sustaining punctures and tears in automobile collisions, are often repairable by automotive body repair and specialty bumper shops. The repair procedure, which often involves the use of a repair material comprised of filler and a binder such as epoxy, urethane, or polyester, frequently results in a repaired surface containing pin holes and sand scratches in the repair material and/or the soft facia substrate.

Similar imperfections are commonly encountered when steel and aluminum components are filled with conventional commercially available glazing or spot putties. After curing, e.g., by solvent evaporation, the putty is sanded to provide a metallic part with an imperfection-free surface.

Due to their brittleness, conventional commercially available putties are inappropriate for use on flexible components. Although they adequately fill pin holes and sand scratches, putty cracking is commonly encountered when the repaired soft facia part is flexed. This necessitates sanding the repaired area to remove the cracked putty and repeating the repair sequence from the putty application step.

Additionally, solvents contained in many conventional commercially available putties may attack the primers used on soft facia, causing cracks to develop in some putties. Solvents can also be absorbed by the soft facia substrate itself. When this occurs, the substrate swells and may remain in that condition for several hours. Sanding the cured putty while the substrate is in the swelled state can result in undercutting the soft facia producing waves or low spots in the surface as the solvents evaporate.

Disclosure of prior art compositions useful as putties on non-flexible parts may be found in the following U.S. patents:

U.S. Pat. No. 3,737,405 (Linder et al), disclosing a composition useful as an auto body putty which contains dipropylene glycol, tripropylene glycol, unsaturated polyester-vinyl monomer and talc;

U.S. Pat. No. 4,009,145 (Hunt) which discloses a filling compound containing unsaturated polyester resin and a tertiary amine derived from meta-carboxy aniline as an accelerator;

U.S. Pat. No. 3,873,475 (Pechacek et al), disclosing a filling, patching or sealing composition including a thermosetting polyester resin containing solid particulate inorganic filler and small hollow filler particles with minor amounts of cellulose acetate butyrate or related mixed esters of cellulose.

U.S. Pat. No. 4,053,448 (Holle), disclosing patching compositions comprising thermosetting unsaturated polyester resins containing minor amounts of inorganic hollow microspheres and a major amount of filler admixture containing silica and an alkaline inorganic powder having a pH greater than 7; and U.S. Pat. No. 4,187,348 (Dearlove et al), disclosing a thermosetting automotive body solder comprised of epoxy resin adduct of epichlorohydrin and bisphenol A, liquid polysulfide rubber, imidazole curing agent and a filler system consisting of aluminum powder, an ion-exchanged clay, wetting agent for the clay and fibrous or plate talc.

As far as applicant knows, there is no known prior art putty which avoids the problems discussed above suitable for use on soft facia.

DISCLOSURE OF INVENTION

The present invention provides a curable one-part composition useful as a putty for filling recessed areas in flexible parts of damaged auto bodies and the like and useful for other purposes. The composition may also be used to fill recessed areas in rigid parts such as in metal surfaces, e.g., automotive parts, appliances, cabinets, furniture and the like.

The composition of the present invention has a viscosity in the range of about 50,000 to 450,000 cps and it comprises, by volume, 6 to 25 parts binder comprising substantially non-reactive solvent-soluble polyurethane, 43 to 68 parts solvent which will not substantially swell the substrate being repaired and 20 to 42 parts talc filler. Other fillers may also be included.

The composition of the present invention has a viscosity which permits it to be easily applied to the surface and provides adequate working consistency and life. The composition dries by solvent evaporation in a commercially acceptable period of time to a flexible solid mass which can be easily finished to a smooth imperfection-free surface by using conventional auto body finishing equipment such as sanding papers, working tools and the like. The putty of the present invention forms a strong, adherent bond to the surface of soft facia automotive parts and other surfaces such as metallic surfaces, paint primers, wood and the like.

BEST MODE FOR CARRYING OUT THE INVENTION

The substantially non-reactive solvent-soluble polyurethane which comprises the binder of the composition of the present invention is a known polyurethane derived from reaction of diisocyanate with ether glycol or polyester. Useful polyurethanes are the linear polyurethanes derived from the reaction of diisocyanate and ether glycol disclosed in U.S. Pat. No. 2,899,411. Such polyurethanes are free of cross-links and unreacted isocyanate. Also useful are the linear polyurethanes prepared by reacting diisocyanate and polyester, as disclosed in U.S. Pat. No. 2,871,218. The disclosures of these two patents are incorporated herein by reference for the description of the methods of preparation of such polyurethanes.

The polyurethane has an elongation at break value of greater than about 175% since polyurethanes having an elongation at break value less than 175% provide a putty which, on curing, is too brittle and cracks easily on flexing.

The binder preferably has an elongation at break value of 300–850% and a tensile strength in the range of about 1,500 to 7,000 psi. The specified degree of elongation and tensile of the polyurethane binder imparts the cured putty with a cohesive strength and adherent nature which provides a tough cured mass which adheres strongly to the substrate upon which it is employed.

A list of commercially available urethane resins found to be suitable for use in the putty of the present composition include the following:

| Urethane Resin | % Elongation | Tensile Strength (PSI) |
|---|---|---|
| "Estane"[1] 5702 | 625 | 3500 |
| "Estane" 5702 F-1 | 625 | 3500 |
| "Estane" 5702 F-2 | 625 | 3500 |
| "Estane" 5703 | 625 | 3500 |
| "Estane" 5703 F-1 | 625 | 3500 |
| "Estane" 5703 F-2 | 625 | 3500 |
| "Estane" 5711 | 650 | 6200 |
| "Estane" 5712 | 650 | 5600 |
| "Estane" 5715 | 300 | 6150 |
| "Estane" 5716 | 600 | 6000 |
| "Spenlite"[2] L90-20A | 500 | 5500 |
| "Spenlite" L83-30S | 750 | 6700 |
| "Spenlite" L61-30S | 500 | 5000 |
| "Spenlite" L89-30S | 350 | 5500 |
| "Spenlite" L03-30S | 400 | 3500 |
| "Spenlite" L06-30S | 600 | 3000 |
| "Spenkel"[3] L91-40K | 500 | 4000 |
| "Spenkel" L85-40K | 850 | 1500 |
| "Desmolac"[4] 2100 | 350 | 3500 |
| "Desmolac" 4125 | 400 | 4350 |

[1]"Estane" is the trade designation of the B. F. Goodrich Company for an aromatic polyurethane resin having ester linkages.
[2]"Spenlite" and
[3]"Spenkel" are trade designations of the Spencer Kellogg Company for linear polyurethane resins.
[4]"Desmolac" is the trade designation of the Mobay Chemical Company for a linear polyurethane resin.

The polyurethane binder is soluble in solvents which do not substantially swell the flexible part being repaired. The absence of substantial swelling is noted by a volume increase of less than 30% after contacting a test sample of the substance forming the substrate with the solvent for approximately 24 hours. Solvents which do not substantially swell conventional soft facia parts of automobiles include water, isopropanol, a blend of isopropanol, water and toluene, a blend of isopropanol, water and methylethyl ketone and n-butanol, butyl "Cellosolve" and mineral spirits. A preferred solvent mixture is provided by a blend consisting of a major portion of isopropanol and a minor portion of toluene.

The putty composition of the present invention also includes 20–42 parts by volume talc filler to minimize shrinkage and facilitate solvent release and to provide a cured composition which is easily sandable. The presence of the talc filler also provides opacity to the cured composition to provide a non-transparent, easily visible mass on the surface to which it has been applied.

Talc, chemically magnesium silicate, is readily commercially available and a known mineral often used as a filler. Talc particles have a plate-like shape and a useful filler of this type has an average particle size of less than 20 microns. Larger particles of talc may provide a rough surface which would require more surface finishing and therefore such larger sizes should be avoided.

The preferred composition of the present invention also includes additional filler materials to minimize shrinkage, reduce cost and facilitate solvent release. Other fillers, utilized in conjunction with the talc filler, may include one or more of the following in the portions designated:

| Filler | % by Volume |
|---|---|
| calcium carbonate | 0–80 |
| carbon black | 0–40 |
| glass bubbles | 0–70 |
| aluminum oxide | 0–10 |
| zinc powder | 0–65 |
| aluminum powder | 0–80 |
| wollastonite | 0–10 |
| barium sulfate | 0–75 |
| mica | 0–10 |
| tripoli | 0–80 |
| diatomaceous earth | 0–20 |
| clay | 0–80 |

The average particle size of the additional filler should also be less than 20 microns and the filler content should be restricted to maintain the required viscosity.

The most preferred composition may include up to 3 parts by volume of a thixotrope, an additive which increases the viscosity of a composition, to provide a more slump-resistant mixture which reduces filler settling and resin separation. The thixotrope most appropriate for a given formulation depends upon the polarity of the solvent system and upon the degree to which the thixotrope may interact with available fillers and polymers to form a gel structure. Preferred thixotropes include the following: a fumed silica available under the trade designation "Cab-O-Sil" M-5, a fumed silica available under the trade designation "Aerosil" 200, and an organically modified clay available under the trade designation "Benton" 27.

The composition of the present invention may also include up to 3% by volume pigment to further accentuate the distinction between the putty and the surface to which it is being applied for ease of handling.

The following examples illustrate and provide the best mode of carrying out the invention. All parts are by volume, unless otherwise specified.

Compositions suitable for use as a putty for filling recessed areas in flexible parts of automobile bodies were prepared with the ingredients as shown in Examples 1–3.

EXAMPLE 1

| Ingredients | Parts |
|---|---|
| aliphatic linear polyurethane with ether linkages available under the trade designation "Spenlite" L90-20A | 64.20 |
| isopropanol | 1.98 |
| talc filler available under the trade designation "Mistron" 139 | 15.57 |
| calcium carbonate filler available under the trade designation "Duramite" | 16.14 |
| iron oxide pigment available under the trade designation "Kroma Red" | 1.01 |
| fumed silica thixotrope available under the trade designation "Cab-O-Sil" M-5 | 1.10 |

EXAMPLE 2

| Ingredients | Parts |
|---|---|
| aliphatic linear polyurethane with ester linkages available under the trade designation "Spenlite" L03-30S | 40.78 |
| isopropanol | 25.11 |
| talc filler available under the trade designation "Mistron" 139 | 15.90 |
| calcium carbonate filler available under the trade designation "Duramite" | 16.50 |
| iron oxide pigment available under the trade | 0.68 |

-continued

| Ingredients | Parts |
| --- | --- |
| designation "Kroma Red" | |
| fumed silica thixotrope available under the trade designation "Cab-C-Sil" M-5 | 1.03 |

EXAMPLE 3

| Ingredients | Parts |
| --- | --- |
| aromatic polyurethane with ester linkages available under the trade designation "Estane" 5703 | 1.64 |
| aromatic polyurethane with ester linkages available under the trade designation "Estane" 5715 | 9.19 |
| isopropanol | 23.58 |
| toluene | 21.13 |
| methylethyl ketone | 11.41 |
| talc filler available under the trade designation "Mistron" 139 | 15.53 |
| calcium carbonate filler available under the trade designation "Duramite" | 16.10 |
| iron oxide pigment available under the trade designation "Kroma Red" | 0.74 |
| fumed silica thixotrope available under the trade designation "Cab-O-Sil" M-5 | 0.68 |

Each of the compositions described in Examples 1–3 were applied to a flat polyurethane soft facia test strip of RIM urethane material and were found to have excellent adhesion, flexibility, sandability and paintability.

I claim:

1. A one-part composition curable upon solvent evaporation having particular utility in providing a putty for use in filling recessed areas in flexible parts of damaged auto bodies and the like, said composition having a viscosity in the range of 50,000 to 450,000 cps and comprising by volume:
   (a) 6–25 parts of a binder comprising substantially non-reactive solvent-soluble polyurethane having an elongation at break value of at least 175%;
   (b) 43–68 parts solvent for said binder, which solvent will not substantially swell the flexible part being repaired; and
   (c) 20–42 parts by volume talc filler having an average particle size less than about 20 microns.

2. The composition of claim 1 also include particulate filler selected from the group consisting of calcium carbonate, carbon black, silica, aluminum oxide, zinc, aluminum, wollanstonite, barium sulfate, mica, tripoli, diatomaceous earth, clay and mixtures thereof.

3. The composition of claim 2 wherein said silica filler is in the form of minute hollow glass bubbles.

4. The composition of claim 1 wherein said polyurethane is a linear polyurethane elastomer substantially free of cross-links.

5. The composition of claim 1 wherein said polyurethane has an elongation at break value in the range of 300–850% and a tensile strength in the range of about 1,500 to 7,000 psi.

* * * * *

UNITED STATES PATENT AND TRADEMARK OFFICE
CERTIFICATE OF CORRECTION

PATENT NO. : 4,451,605

DATED : May 29, 1984

INVENTOR(S) : JOHN J. THEODORE

It is certified that error appears in the above-identified patent and that said Letters Patent is hereby corrected as shown below:

In the Claims:

Col. 6, line 18, "also include" should read --also including--.

Signed and Sealed this

Ninth Day of October 1984

[SEAL]

Attest:

*Attesting Officer*

GERALD J. MOSSINGHOFF

*Commissioner of Patents and Trademarks*